United States Patent [19]
Lehman et al.

[11] 3,853,213
[45] Dec. 10, 1974

[54] LEHR LOADER

[75] Inventors: James E. Lehman; John S. Lush, both of Lancaster, Ohio

[73] Assignee: Anchor Hocking Corporation, Lancaster, Ohio

[22] Filed: Mar. 22, 1973

[21] Appl. No.: 343,907

[52] U.S. Cl. ............ 198/31 AB, 198/24, 198/31 AA
[51] Int. Cl. ............................................. B65g 47/26
[58] Field of Search .......... 198/31 R, 31 AA, 31 AB, 198/31 AC, 221, 21, 24, 40, 106, 20; 74/45

[56] References Cited
UNITED STATES PATENTS

| | | | |
|---|---|---|---|
| 966,524 | 8/1910 | Chace et al. | 74/45 |
| 1,867,389 | 7/1932 | Sylvester | 198/31 AA |
| 2,547,791 | 4/1951 | Smith et al. | 198/31 AA |
| 3,040,967 | 6/1962 | Posten et al. | 198/24 |
| 3,184,031 | 5/1965 | Dunlap | 198/24 |

Primary Examiner—Evon C. Blunk
Assistant Examiner—Joseph E. Valenza
Attorney, Agent, or Firm—Wood, Herron & Evans

[57] ABSTRACT

A lehr loading apparatus transfers glassware articles emerging single file from a forming apparatus onto a lehr belt in successive rows. Glassware is discharged onto a take-off conveyor from the forming apparatus and is transferred in separate take-off cycles to a cross conveyor by a take-off pusher operating in response to the discharge of ware from the forming apparatus. A second pusher, operating in response to a predetermined number of take-off cycles, gently engages and transfers a row of ware from the cross conveyor onto the lehr belt. After a forward transfer motion, the second pusher dwells to allow the transferred ware to clear, then is lifted and returned to its start position. An improved releasable crank and lever drive is provided to insure a smooth gentle transfer stroke and eliminate damage. Various operating parameters are adjustable during operation of the loader to accommodate ware of varying shapes and sizes. Extreme fine tuning is accomplished through such adjustments and unstable ware is effectively handled.

25 Claims, 15 Drawing Figures

LEHR LOADER

This invention relates to lehr loaders of the overhead "push-in" type and particularly to methods and apparatus for transferring glassware articles emerging in single file relation from a forming apparatus onto a lehr belt in rows.

In a typical glassware making process, the ware articles are molded or formed in a forming apparatus and are thereafter transferred to a glass-annealing lehr. The actual transfer of the ware onto the lehr is critical, and care is required in the transfer. ware can be marred, weakened, deformed or otherwise damaged by contact with foreign objects or by touching other ware.

A related problem is instability. Where ware has a small base in relation to its other dimensions, it is relatively unstable and may tip easily. Ware having a relatively large body diameter and a small base diameter not only is unstable, but when upset may roll about and upset other ware. Due to the possibility of ware damage at this time in the process, it is necessary to transfer the ware as gently as possible and to avoid any abrupt engagement which may damage or upset it.

For some time, it has been the practice to transfer single articles of ware moving from the forming apparatus onto a lehr belt in successive rows or multiple adjacent files so that the ware exends across the dimension of the annealing lehr. Typical prior apparatus for performing such a transfer are described, for example, in U.S. Pat. Nos. 3,184,031; 3,040,867; and 2,390,725.

In the prior art, it has been customary to transfer ware moving from the forming apparatus on a so-called take-off conveyor, onto a cross conveyor, essentially transverse to it. The cross conveyor in turn carries the ware, still in single file relation, across the front of the lehr. The ware is then transferred, several articles at a time, from the cross conveyor onto a slower moving, wide lehr belt.

A pusher bar is commonly utilized to engage the ware in the row and to push it off the cross conveyor onto the lehr belt. After the ware has been pushed onto the lehr belt, the pusher bar is raised, returned and then lowered to its starting position where it may dwell for a short time prior to another cycle. In such apparatus, the path of the pusher bar appears to be rectangular when viewed from the side of the apparatus. Since the cross conveyor is operated continuously, ware continues to be conveyed into the pusher bar path after it has pushed a row onto the lehr belt but before it has returned; raising the pusher bar over the tops of the articles prior to its return movement avoids toppling the incoming ware.

As shown in U.S. Pat. No. 3,184,031, the forward motion of the pusher bar may not be directly transverse (i.e., perpendicular) to the cross conveyor but may be diagonal with respect thereto. In such case, skidding of the ware directly across the cross conveyor is avoided, and the ware has at least a component of motion in the direction of movement of the cross conveyor.

To provide such diagonal movement it is known to provide two carriages moving in controlled directions, to provide a resultant diagonal movement. A main carriage has been mounted for movement toward and away from the lehr belt and parallel to the direction of lehr travel. A second carriage is mounted on the main carriage for transverse movement with respect to the main carriage. The pusher bar is mounted by this second carriage for vertical movement with respect to it.

In operation of machinery of this type, the main carriage moves forwardly carrying the second carriage, and the pusher bar is thus moved over the cross conveyor. At the same time, the second carriage is controlled, as by a cam, to move in a transverse direction with respect to the main carriage. The resultant diagonal movement of the pusher bar is thus derived from a combination of the respective forward and transverse movement of the main and second carriages.

The pusher bar cycle has, in the past, been initiated by control devices, such as control cams. Ware engaging wheels have also been used to initiate the cycle. Operation of the pusher bar has been timed to correspond to the speed of the cross conveyor.

With such prior art apparatus, the main movements of the pusher bar, particularly where motiviated by air cylinders, have been rather abrupt and have caused more tipping of the ware during transfer than is desirable. This abrupt motion when used with ware which is inherently unstable, is intolerable. At times it has caused round-shaped ware with small bases even to roll through a lehr, knocking over and damaging other ware.

Although certain operation parameters of the prior apparatus have been adjustable, the adjustments have been difficult to accomplish, particularly without stopping the entire apparatus. The ability to adjust the operating parameters during operation greatly facilitates machine set-up and tuning. Moreover the motion of past carriages has been relatively inflexible during the cycle of operation. Thus, should ware be broken within the system, or if some foreign object is presented, loader operation would continue until a disenabling jam or other damage resulted.

In the past machines, the pusher bar has been cycled without regard to the actual presence of ware in the system. We have determined that it is advantageous to operate the pusher bar in response to the discharge of ware from or onto a preselected position in the system.

Accordingly, one objective of this invention has been to provide a lehr loader with apparatus for transferring ware articles onto a cross conveyor in response to a signal that coincides with the ware articles as they emerge from a forming apparatus.

Another objective of the invention has been to provide a lehr loader with means to transfer a plurality of articles in row form, from a cross conveyor onto a lehr belt in response to the transfer of such plurality of ware articles onto the cross conveyor.

A further objective of the invention has been to provide a lehr loader with a pusher bar and means controlling the pusher bar in forward, upward, and rearward directions between dwell periods which are provided to allow ware transferred on the lehr belt to clear the pusher bar prior to its upward stroke, and to insure that the pusher bar has been lifted prior to its return stroke.

A further object of the invention has been to provide the main carriage of the lehr loader with an improved smoother driving apparatus.

A further objective of the invention has been to provide a lehr loader with improved apparatus for adjusting the operational parameters of the loader to accommodate ware articles having a wide variety of shapes and sizes.

A yet further objective of the invention has been to provide a lehr loader having an overload drive release to eliminate jamming and malfunction.

A further objective of the invention has been to provide a ware pusher bar mounted to conveniently rotate and pass over relatively small obstructions prior to release of the overload drive release mechanism.

In a preferred embodiment of the invention, a lehr loader includes a take-off conveyor, a cross conveyor, a lehr conveyor or belt, and means for signalling the emergence of ware articles from the forming apparatus onto the take-off conveyor and for transferring the articles to the cross conveyor in response to said signalling. A counter counts the number of article transfers onto the cross conveyor, and initiates a pusher bar cycle to transfer a row of ware from the cross conveyor onto the lehr conveyor when a predetermined count is reached.

The pusher bar is thus actuated directly in response to the spotting of a predetermined number of articles onto the cross conveyor and indirectly in response to the actual discharge of the articles from the forming apparatus. Since the pusher bar is indirectly actuated in response to the actual number of articles discharged from the forming apparatus, and directly in response to the number of transfers onto the cross conveyor, the proper maximum of articles for transfer onto the lehr belt is insured, and surplus articles are eliminated.

The pusher bar moves forwardly to transfer the row of ware onto the lehr conveyor and then dwells while the ware is conveyed away from the bar by the lehr conveyor. After the dwell, the bar (1) moves upwardly, clearing the transferred ware, (2) dwells to insure a full upward lift, (3) moves rearwardly, clearing articles on the cross conveyor, and (4) moves downwardly to its starting position for a succeeding cycle.

The bar is mounted on a second or cross carriage which in turn is carried by a main carriage. The main carriage moves forwardly and rearwardly with respect to the lehr loader and the second carriage moves transversely with respect to the main carriage. The combination of, for example, the forward motion of the main carriage and the transverse motion of the second carriage results in a diagonal pusher bar motion across the cross conveyor.

The main carriage is driven by a lever pivoted at one end point to a frame of the loader and releasably connected at another end point to the main carriage. A driven crank is positioned adjacent the lever and a drive pin on one end of the crank resides in a slot intermediate the points at which the lever is connected to the frame and to the main carriage. The crank and its driving mechanism are set so that rotation of the crank through a predetermined number of degrees moves the lever forwardly. Rotation of the crank through a second predetermined number of degrees moves the lever rearwardly. The main carriage is thus driven in a simple harmonic motion which results in a very smooth and relatively slow forward pusher bar motion and a relatively quick pusher bar return.

The smooth forward pusher bar stroke, taken in conjunction with its generally diagonal direction, results in a very gentle engagement with the ware and is very effective even with inherently unstable ware. Once the pusher bar is disengaged from the ware, it is quickly returned rearwardly. This quick return provides more time in the cycle for forward article engaging movements by reducing the time required for relatively non-critical pusher bar movements.

The drive pin is adjustable along the crank to vary the stroke of the lever and thus of the main carriage and pusher bar. The releasable connection between the main carriage and the lever is adjustable forwardly and rearwardly on the main carriage in order to adjust the initial start position of the pusher bar.

A cam follower is attached to the second carriage and extends into an adjustable cam track which moves the follower and the second carriage in a transverse direction when the main carriage moves forwardly or rearwardly. The cam track is adjustable to adjust both path and the extent of transverse movement of the second carriage and the pusher bar.

An air cylinder is connected to operate a rack and pinion drive in turn connected to lift the pusher bar after the dwell period following its forward stroke. The stroke of the air cylinder is adjustable in order to provide adjustment for the vertical movement of the pusher bar.

All of the adjustments (excepting the crank pin adjustment) can be conveniently made during operation of the loader, so that the substantial downtime previously needed to set up the loader to handle ware of various sizes and shapes, is eliminated. A stroke length gauge is provided on the crank so that the drive pin can be quickly and easily adjusted when the crank is stopped. It can thus be appreciated that the various dwell periods and adjustments can be correlated to provide an extremely smooth and gentle ware handling operation.

These and other objectives and advantages will become readily apparent from the following detailed description and drawings in which:

FIG. 7 is a front view of the pusher bar and its driving apparatus;

GENERAL DESCRIPTION AND OPERATION

Figures 1, 2, 3, 4:
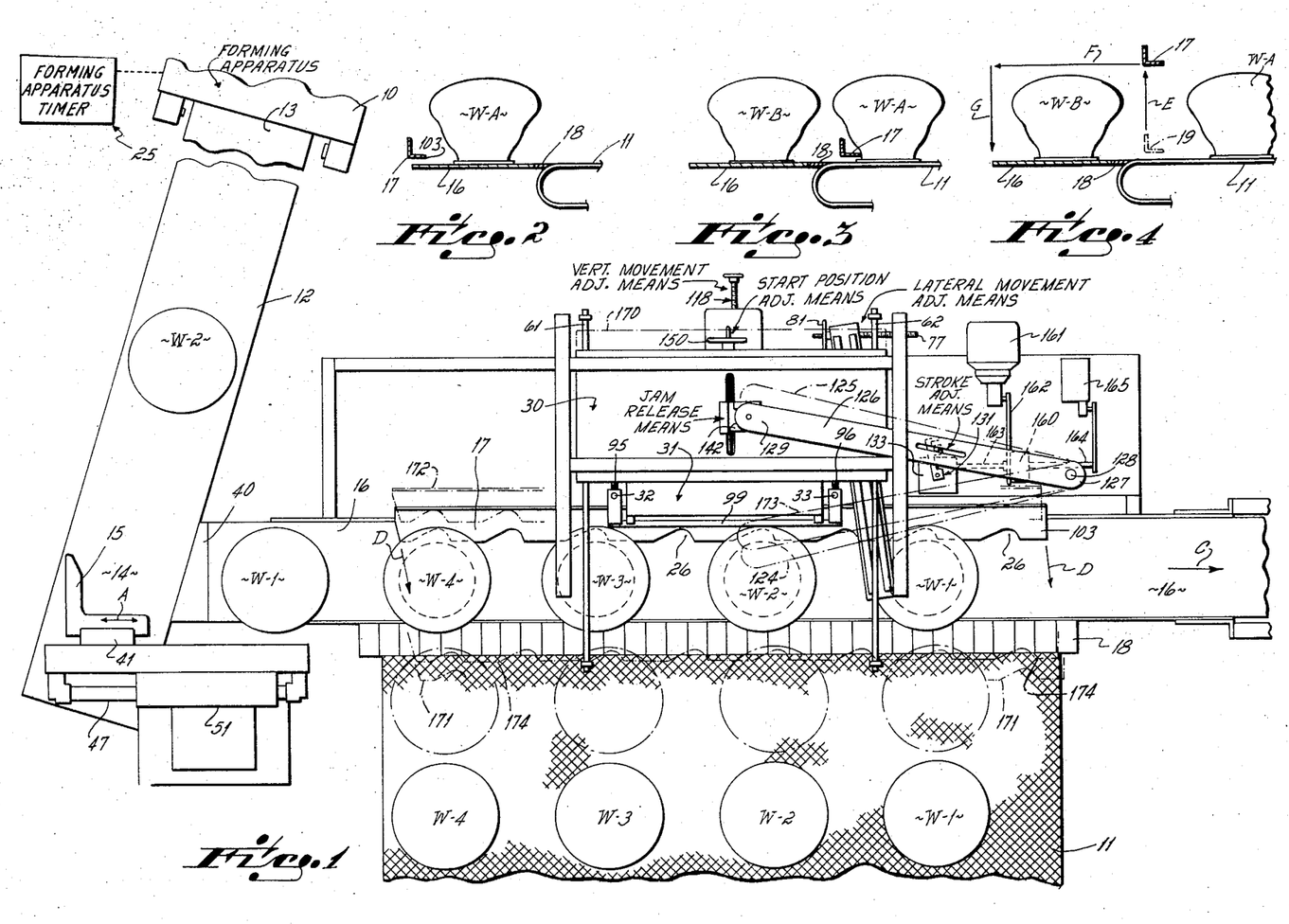
FIG. 1 is a plan view, partly broken away, of a prepared form of lehr loading apparatus according to the invention.
FIGS. 2–4 are diagrammatic views showing the operation of the pusher bar at different sequential times as an unstable object is moved onto the belt.

Referring now to the drawings, FIG. 1 depicts a preferred lehr loading apparatus incorporating the features and improvements of the present invention. The basic function of the lehr loader depicted in FIG. 1 is to receive glassware articles in single file from a glassware forming machine as indicated at 10 and to transfer the glassware articles onto a lehr belt 11 in multiple adjacent rows prior to entering a conventional glass-annealing lehr (not shown in FIG. 1). For the purpose of clarity and understanding, the basic components and operation of the lehr loading apparatus will first be described.

Generally, the lehr loader of the present invention includes a take-off conveyor 12 having a ware receiving end 13 and a ware discharge end 14, which forms a take-off position for the ware. Glassware articles W are received from the forming apparatus 10 and are conveyed in a single file disposition by the take-off conveyor toward its discharge end 14. The forming apparatus may have a ware discharging gate (not shown) which spaces discharged articles on the take-off conveyor.

A "ware-spotter" apparatus including a take-off pusher 15 is located at the discharge end 14 and reciprocates in the direction of double Arrow A to transfer glassware articles W from the take-off conveyor 12 onto a cross conveyor 16. The cross conveyor 16 is positioned adjacent the discharge end 14 of the take-off conveyor and operates in the direction of Arrow C, generally transverse to the direction of operation of the take-off conveyor 12.

When a predetermined number of glassware articles, such as those indicated at W-1, W-2, W-3, W-4, have been transferred to the cross conveyor 16, a pusher bar 17 is actuated in a diagonal direction (indicated by the Arrows D) to concurrently transfer or to push the glassware articles from the conveyor 16 onto the lehr belt 11. The lehr belt operates in a direction which is generally transverse to the cross conveyor 16. To insure a relatively smooth transfer from the cross conveyor 16 onto the lehr belt 11, a segmented dead plate 18 is provided between the cross conveyor 16 and the lehr belt 11 and supports the bottles as they are transferred from the cross conveyor onto the lehr belt.

After the pusher bar 17 has transferred the glassware articles from the cross conveyor onto the lehr belt, it is returned to its starting position. The transfer and return movements of the pusher bar 17 are diagrammatically shown in FIGS. 2, 3, and 4 of the drawings. In FIG. 2, a number of glassware articles have been transferred onto the cross conveyor 16. These articles are in line and only the article indicated at W-A can be seen in this view.

In FIG. 3, the pusher bar 17 has moved forwardly to transfer the in-line glassware from the cross conveyor 16 over the dead plate 18 and onto the lehr belt 11. The cross conveyor continues to operate during the movement of the pusher bar 17 and subsequent in-line glassware articles (only W-B can be seen) are continuously being transferred from the take-off conveyor onto the cross conveyor 16.

FIG. 4 depicts the return movement of the pusher bar 17 to its starting position. In FIG. 4, the forward stroke of the pusher bar 17 has stopped at the position indicated by the phantom lines at 19. Although the pusher dwells in the position indicated by phantom lines 19, the lehr belt 11 continues to move to convey the in-line glassware articles forwardly and away from the pusher bar. When sufficient time has elapsed so that the pusher bar will clear the glassware, it is then actuated in the direction of Arrow E in an upwardly direction. After a short dwell to insure that it has been lifted, it is moved rearwardly, as indicated by Arrow F, and thence downwardly as indicated by the Arrow G to its start position. By virtue of this described motion, the pusher bar 17 clears the glassware which has been transferred to and conveyed by the cross conveyor 16 during and after the forward motion of the pusher bar 17.

As will be later discussed in more detail, it has been found advantageous to utilize a signal taken from an actual part of the forming apparatus control circuitry to control the take-off pusher. When a glassware article is discharged, the forming apparatus timer 25 indicates the article discharge and a signal is generated to control the take-off pusher 15 after a suitable time. The speed of the take-off conveyor 12 is correlated with the timer such that the take-off pusher 15 is actuated when the glassware article reaches the discharge end 14 of the take-off conveyor. The take-off pusher 15 then reciprocates in a take-off or transfer cycle to transfer the detected glassware onto the cross conveyor 16.

A counting means is associated with the pusher so as to count the take-off cycles. When a predetermined number of cycles have been counted, the pusher bar 17 is actuated to engage the glassware on the cross conveyor 16 and to push it onto the lehr belt 11. Thus the glassware pusher bar 17 is not moved in an absolutely cyclical manner but rather begins its motion only in response to a predetermined number of take-off cycles of the take-off pusher 15. The pusher 15 in turn only operates in response to a signal indicating ware discharge onto the ware receiving end of the take-off conveyor.

Of course, ware sensing means, such as an electric eye, could be utilized, in conjunction with a timer, to control the take-off pusher 15. If, however, a ware article was not actually discharged, and since the drive for the main pusher bar 17 is controlled by operation of the pusher bar 15, an article could be conveyed by the cross conveyor beyond the pusher bar 17. Use of the timing means of the forming apparatus obviates this problem.

The diagonal motion of the pusher bar 17 is provided in order to accommodate the movement of the glassware 17 by the cross conveyor 16 in the direction of Arrow C as the pusher bar engages the glassware. The diagonal motion is not so abrupt a directional change as a full transverse motion across the moving conveyor and is more advantageous for the positive handling of the sensitive ware. In this invention, it is desirable that the ware be moving parallel of the direction of lehr movement, at least at the end of the pusher cycle. This can be achieved by providing an appropriate shape of the cam track, as will become apparent.

It will be noted that the pusher bar 17 is provided with notches as at 26. These notches have on one side a relatively slight incline and on another side a relatively steep incline. This facilitates engagement of the pusher bar with the glassware articles in an advantageous manner as can be appreciated.

The diagonal motion D of the pusher bar 17 is achieved as a result of the simultaneous motions of a main carriage 30 in a forward direction parallel to the direction of movement of the lehr belt 11, and of the motion of a second carriage 31 in a direction transverse with respect to the forward directional motion of the main carriage 30. Different views of these two carriages are more clearly seen in FIGS. 7 and 8 of the drawings. As best seen in FIG. 7, the pusher bar 17 is connected to the second carriage 31 via lift bars 32 and 33. These bars are actuated, in a manner which will be described, to raise and lower the pusher bar 17 in respective directions which are generally vertical with respect to the glassware and to the lehr belt 11.

DETAILED DESCRIPTION

Take-Off Pusher

Figure 5:
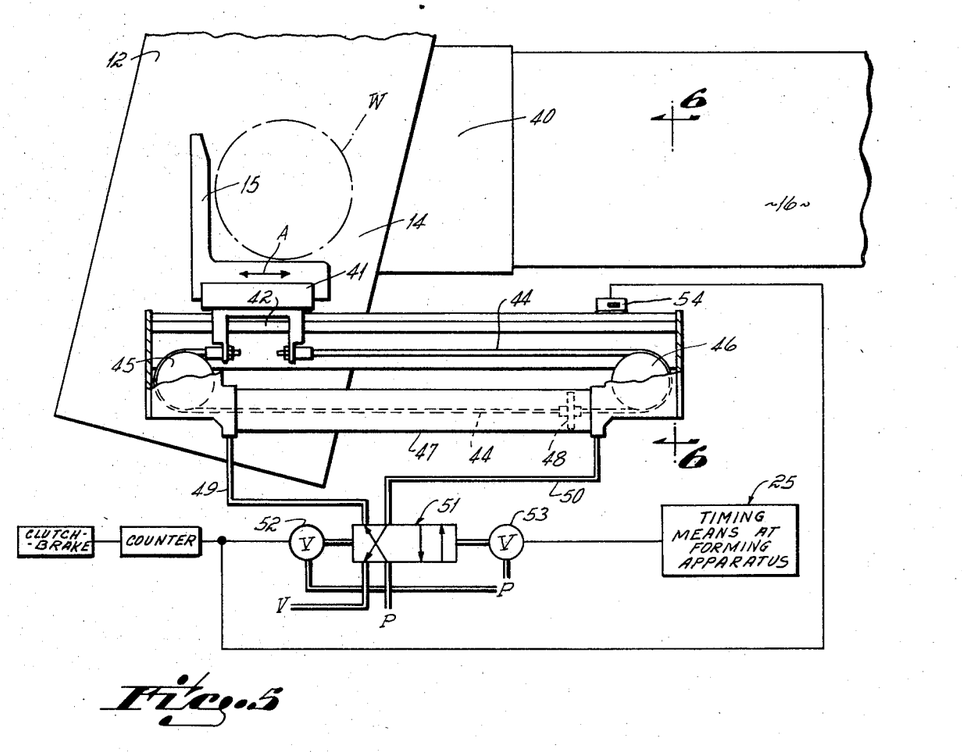
FIG. 5 is a plan view, somewhat diagrammatic in nature, of the "ware-spotter" and take-off apparatus.
Figure 6:
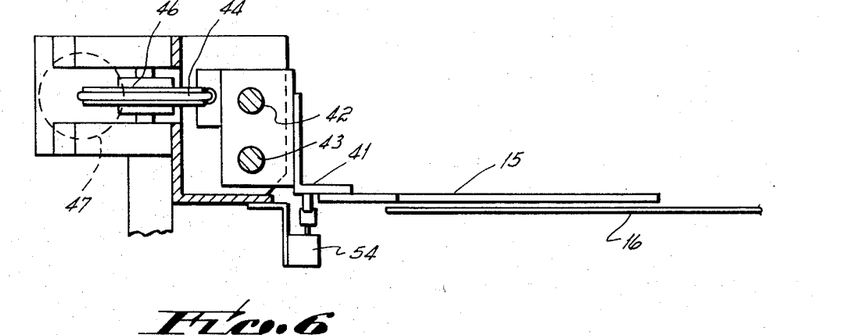
FIG. 6 is a view taken along lines 6—6 of FIG. 5 and rotated 90°.

The take-off or ware-spotter apparatus for discharging ware from the take-off conveyor onto the cross conveyor is specifically illustrated in FIGS. 5 and 6 of the drawings. A take-off pusher 15 is best seen in FIG. 6 and comprises a flat plate for engaging the bottom of a glassware article, and for pushing it from the take-off conveyor 12 across the dead plate 40 and onto the cross conveyor 16. The take-off pusher 15 is mounted on a bracket 41 which in turn is mounted on ways 42 and 43 for sliding motion in the directions indicated by the double Arrow A. A fluid operated drive is used to operate the pusher 15. To this end, the bracket 41 is connected to a flexible member, such as a cable 44, which is drawn around two pulleys 45 and 46. A portion of the cable runs through an air cylinder 47 and a piston 48 is connected to the cable within the air cylinder.

Fluid conduits 49 and 50 are selectively connected through a fluid valve 51 to a source of pressure air P and a vent V. Control valves 52 and 53 are also connected to a source of pressurized air P for alternately actuating the valve 51. Control valves 52 and 53 may be of the electric solenoid actuated type for passing or stopping the flow of pressurized air therethrough. Of course, any suitable driving apparatus for the take-off pusher 15 can be provided and the diagrammatic illustrations of the drawings and this explanation is for clarity only.

In order to control the take-off pusher 15 in separate take-off cycles, fluid such as pressurized air, is applied to the air cylinder 47 so as to drive the cable 44 and move the pusher 15 from its position over the take-off conveyor 12 toward the cross conveyor 16. Thereafter pressurized air is applied to the cylinder to return the take-off pusher 15 to its starting position.

It has been found convenient to utilize the control circuitry and apparatus of the forming machine to control the take-off pusher 15. The forming apparatus is located at the ware receiving or input end of the take-off conveyor. When an article emerges from or is discharged by the forming apparatus onto the take-off conveyor, the forming apparatus control generates a signal coinciding with the emergence of ware.

For purposes of description, the discharge of ware articles from the forming apparatus and the signal coinciding with the discharge or emergence of ware from the forming apparatus can be considered to be the detection of ware on the take-off conveyor and the control circuitry to be means for detecting ware on the take-off conveyor. Of course, some other ware presence signalling or detection means could be utilized.

When a glassware article is discharged by the forming apparatus, a pulsed signal indicates the discharge. At the end of a predetermined period, the control valve 53 is then signalled. The timing or other device in the forming apparatus control may be adapted to provide the delay. The control valve opens to momentarily pass prssurized air to the valve 51 and to move the valve 51 to the left as viewed in FIG. 5. This connects the fluid conduit 50 with pressurized air and the conduit 49 to the vent. The piston 48 is consequently moved to the left, as viewed in FIG. 5, thereby causing the cable 44 to pull the take-off pusher 15 to the right. This transfers the previously detected glassware article W, which has now reached the discharge end 14 of the take-off conveyor, across the dead plate 40 and onto the cross conveyor 16.

When the take-off pusher 15 reaches its extreme discharge position, it engages the limit switch 54. The limit switch is connected to the control valve 52 in a suitable manner such that when the limit switch is contacted by the take-off pusher 15, it signals the control valve 52 to momentarily supply pressurized air to the valve 51. This moves the valve 51 to the right (its position as shown in FIG. 5). In this condition, pressurized air is connected through the fluid conduit 49 to the air cylinder 47 and drives the piston 48 to the right, conduit 50 being vented. This causes the cable 44 to return the take-off pusher 15 to its original starting position as shown in FIG. 5.

The contacting of the limit switch 54 by the take-off pusher 15 additionally signals a counter, of any suitable type, to count the number of pusher take-off cycles. Upon counting a preselected number of take-off cycles, the counter signals a clutch to engage the driving mechanism of the apparatus utilized for transferring a plurality of articles from the cross conveyor onto the lehr belt.

Thus, from this description, it can be seen that the take-off pusher (ware-spotter) is controlled in response to the discharge of glassware articles onto the take-off conveyor 12 from the forming apparatus. Also, the pusher bar driving apparatus of the lehr loader is operated in response to a predetermined count of take-off cycles of the take-off pusher 15, and thus indirectly by the discharge of ware at the forming apparatus.

THE CARRIAGES

Figure 8:
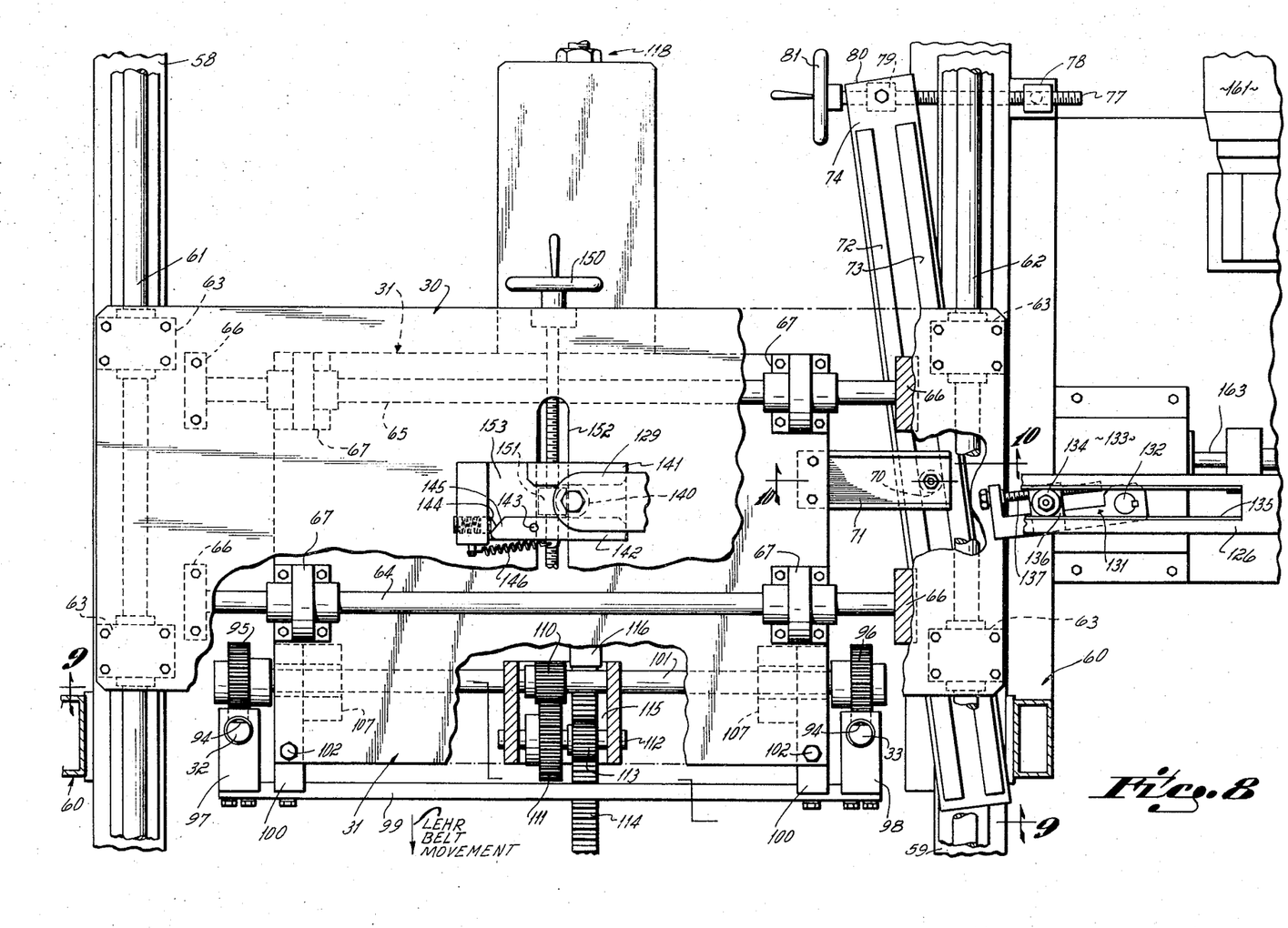
FIG. 8 is a top view taken along lines 8—8 of FIG. 7.

The various carriages and drive mechanisms for the pusher bar 17 are mounted on and supported by a frame 60, a portion of which is shown in FIG. 7. The details of the main carriage and of the secondary carriage are perhaps best seen in FIGS. 7–9 and 11. The main carriage 30 is mounted for sliding movement upon ways 61 and 62 which are secured to the frame 60 by supporting brackets 58 and 59, respectively. In FIG. 8, it can be seen that the ways 61 and 62 extend in a direction which is generally parallel to the direction of movement of the lehr belt 11, which is not seen in FIG. 8 but whose motion is indicated by the arrow labeled "Lehr Belt Movement". The main carriage 30 is supported on the ways by brackets 63 and can be moved in first and second directions which are respectively forwardly toward the lehr belt or rearwardly away from the lehr belt and parallel thereto.

Fixedly mounted on the main carriage 30, via brackets 66, are ways 64 and 65. These ways are mounted transversely on the main carriage and extend generally in a perpendicular direction with respect to the ways 61 and 62. Brackets 67 are secured to the second carriage 31 and embrace the ways 64 and 65 to slidably support the second carriage 31. The second carriage 31 is thus mounted for movement, with respect to the main carriage 30, in opposite third and fourth directions, which are generally transverse to the first and second directions previously described.

Figure 10:
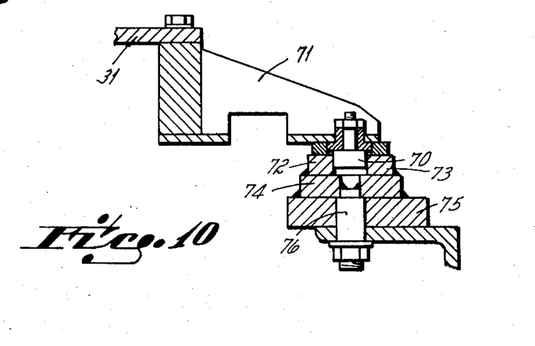
FIG. 10 is a sectional view taken along lines 10—10 of FIG. 8.

In order to control the movement of the second carriage 31 in its third and fourth directions, a cam follower 70 is rigidly secured to the second carriage 31 via a cam follower bracket 71. The cam follower 70 is positioned within a cam slot defined by the cam bars 72 and 73. As seen in FIG. 10, the cam apparatus includes cam supporting members 74 and 75. These members are pivoted, via a spindle 76, to a portion of the frame 60. The actual pivot point for the cam mechanism is not indicated in the drawings, however, it will be noted that the cam should preferably be pivoted at some point intermediate its ends so that the movement of the second carriage 31, in its third and fourth directions, would not be too extreme to one side or the other should the cam be set for no movement whatsoever of the second carriage in the third and fourth directions, i.e. parallel to ways 61 and 62 and to the lehr belt movement.

In order to adjust the extent of movement of the second carriage in the third and fourth directions, a lateral movement adjustment screw 77 is threaded as at 78 to a stationary portion of the frame 60. The screw is journaled at 79 to an end 80 of the pivotable cam apparatus. By rotating the screw through adjustment wheel 81, the cam can be pivoted about its pivot point through a desired range. This adjustment can be made during operation of the loader.

Since the follower 70 resides in the cam slot, the movement of the second carriage in the third and fourth directions is limited by the disposition of the cam slot as can be appreciated from FIG. 8. If the cam slot is adjusted so that it is parallel with the ways 61 and 62, then it can be appreciated that the second carriage will not move at all with respect to the main carriage 30.

THE PUSHER BAR

The pusher bar 17 is carried by and moves with the second carriage 31. The pusher bar 17 is itself attached to lift bars 32 and 33 by a suitable connection. Slots 90 and 91 are provided in the pusher bar so that it can be adjusted laterally with respect to the lift bars 32 and 33 as viewed in FIG. 7. Additionally, intermediate connecting members 92 and 93 are utilized to attach the pusher bar 17 onto the lift bars 32 and 33. These members provide means for initially adjusting the pusher bar 17 up or down with respect to the lift bars 32 and 33.

Notches are provided in the pusher bar to engage the bases of articles to be transferred. The notches correspond in number to the number of articles to be transferred to the lehr belt in a single form and pusher motion. Of course, the pusher bar may be detached and another bar substituted therefor in order to accommodate articles of different shapes and sizes.

Figures 1, 12, 13, 14, 15:
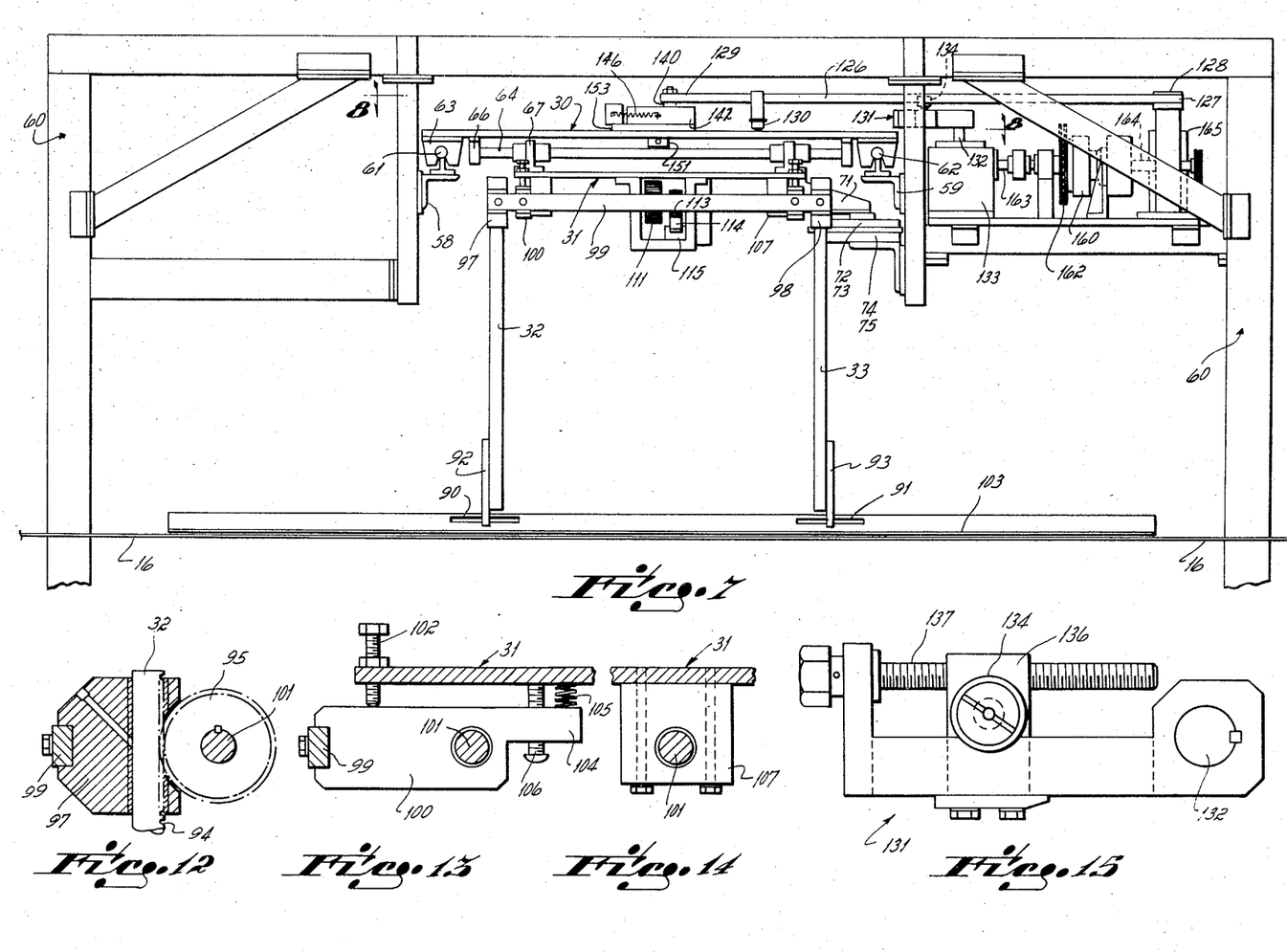
FIG. 12 is a sectional view taken along lines 12—12 of FIG. 9.
FIG. 13 is a sectional view taken along lines 13—13 of FIG. 9.
FIG. 14 is a sectional view taken along lines 14—14 of FIG. 9.
FIG. 15 is a detailed view of the adjustable crank and pin drive for the main carriage lever drive.

The lift bars 32 and 33 are provided on one side with teeth 94 designed to cooperate with teeth on respective gear wheels 95 and 96 (FIGS. 8 and 12). The lift bars 32 and 33 are slidably mounted in brackets 97 and 98 respectively. These brackets are mounted on a flat 99 which in turn is rotatably mounted, via brackets 100, on a lift bar drive shaft 101. Thus the pusher bar is indirectly pivoted to the second carriage. Brackets 100 carry extensions 104. Compression springs 105 are mounted between the extensions and the carriage 31 to bias the brackets 97 and 98 in a clockwise direction. As shown in FIGS. 8 and 12, when the driven shaft 101 is rotated, gear wheels 95 and 96 rotate in a selected direction and drive the lift bars 32 and 33 in vertical opposite fifth and sixth directions, (depending on the direction of rotation of the driven shaft 101).

A fine screw adjustment, such as indicated at 102 in FIG. 13, is provided to adjust the vertical disposition of the lift bars 32 and 33. The springs 105 bias the brackets 100 against the screw 102. When the fine screw adjustment is maneuvered to rotate the bracket 100 counterclockwise about the drive shaft 101 (FIG. 13), it can be appreciated that the lift bars will be reoriented with respect to the vertical, as shown in FIG. 12, such that the bottom of the lift bar would be moved to the right, as viewed in FIG. 12, and the top of the lift bar would be rotated slightly to the left. Opposite movement of the fine adjustment screw 102 results in an opposite orientation of the lift bars. Should the pusher bar 17 engage an obstruction during its forward movement, it will be rotated about shaft 101 and may lift over the obstruction as the second carriage continues forwardly. Jamming and malfunction caused by relatively small obstructions are thus eliminated. The adjusting screw 106 is provided on bracket extension 104 to limit this rotation and lifting motion of the pusher bar.

Figures 9, 11:
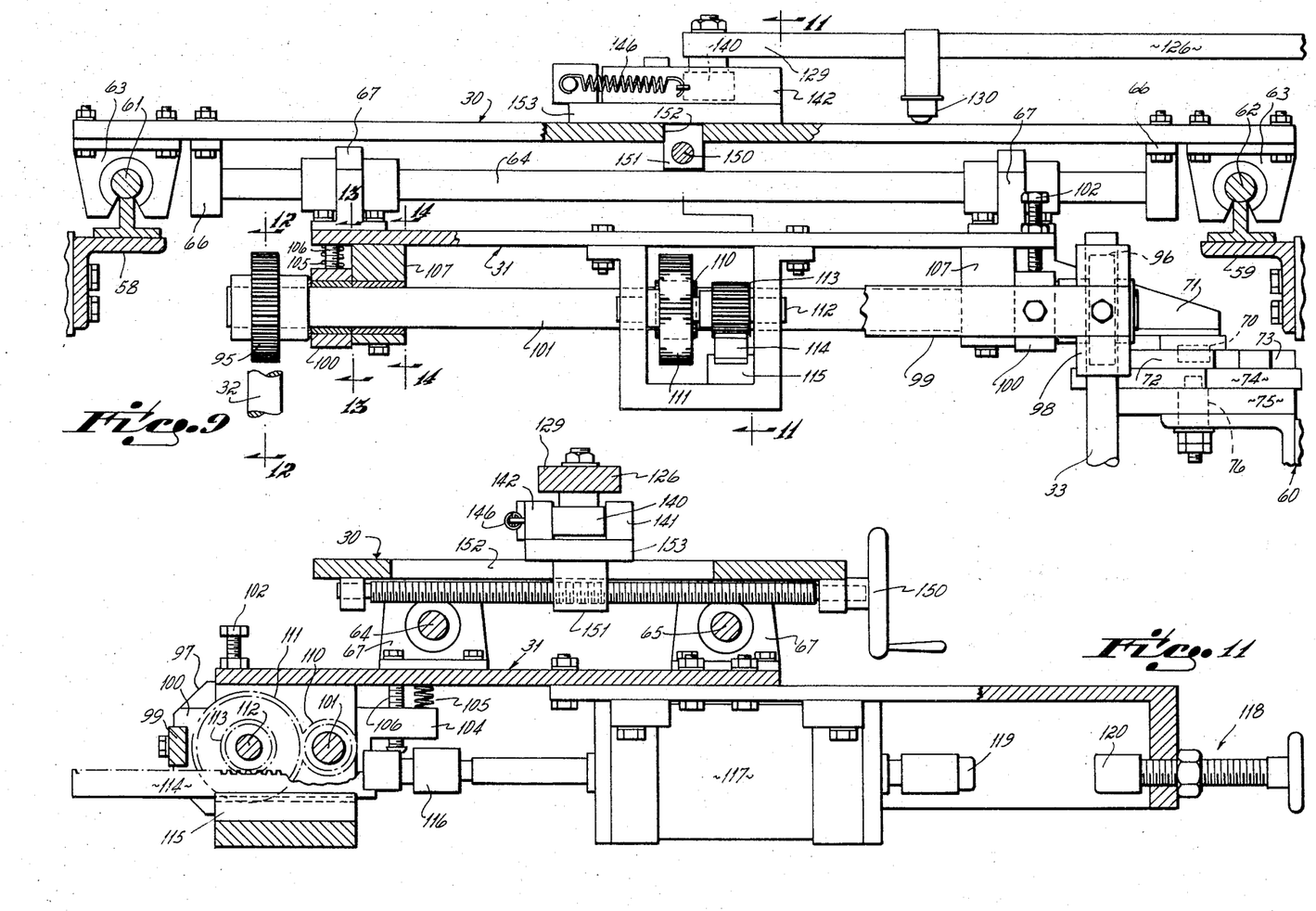
FIG. 9 is a front view taken along lines 9—9 of FIG. 8.
FIG. 11 is a sectional view taken along lines 11—11 of FIG. 9.

The lift bar drive shaft 101 is journalled in appropriate sleeve bearings and is mounted to the second carriage 31 as by mounting blocks 107 (FIGS. 9 and 14). The lift bar drive shaft 101 is driven through a rack and pinion reducing drive powered by an air cylinder with an adjustable stroke. The elements of this drive are best seen in FIGS. 8, 9 and 11.

A gear wheel 110 is fixedly mounted on the lift bar drive shaft 101 and meshes with a driven gear wheel 111. Driven gear wheel 111 is mounted on a shaft 112 and pinion 113 is also secured to shaft 112. A rack 114 is slidably mounted in a bracket 115 and is connected to a piston rod 116 extending from an air cylinder 117. As the piston rod reciprocates, it drives the rack which meshes with the pinion 113 and thereby rotates the driven gear wheel 111. Gear wheel 111 rotates the gear 110 and, therefore, the lift bar drive shaft.

The stroke of the air cylinder is adjustable, during operation of the loader, to regulate the vertical distance through which the lift bars 32 and 33 will be lifted by virtue of the drive which has been described. This stroke adjustment includes a vertical movement adjustment screw mechanism 118. As a piston (not shown) in the air cylinder 117 is moved to the right, as viewed in FIG. 11, a second piston rod 119 engages an abutment 120 on the end of the screw mechanism 118 and, therefore, the stroke of the air cylinder and movement of the rack 114 is limited.

It will be appreciated that movement to the right, as viewed in FIG. 11, of the air cylinder piston rod 116 results in a rotation of the shaft 101 and thus a lifting motion is imparted to the lift bars 32 and 33. In result then, the extent of movement of pusher bar 17, in the direction of Arrow E (FIG. 4), is controlled by virtue of the vertical movement adjustment screw mechanism 118. The air cylinder 117 is controlled to move the pusher bar in its fifth and sixth vertical directions as will be hereinafter described.

MAIN CARRIAGE LEVER DRIVE

Improved drive apparatus is provided for driving the main carriage 30 in its first and second directions. The improved driving apparatus includes an elongated lever arm 126 which is pivoted at a first end 127 at a pivot point 128. At a second end 129, the elongated lever arm 126 is releasably connected to the main carriage 30. A roller support 130 is provided on the elongated lever for support.

As best seen in FIG. 1, the elonated lever 126 is pivoted around the pivot point 128 to move the main carriage 30 in its first and second directions. The extreme forward and rearward positions of the lever arm are shown by the phantom lines 124 and 125 respectively. An extreme rearward main carriage position, corresponding to the lever position shown by lines 125, is indicated by phantom lines 170. The extreme forward position of the main carriage, corresponding to phantom lever position 124, is not indicated; however, the extreme forward position of the pusher bar 17 is shown by phantom lines 171. The extreme rearward pusher bar position is shown by the phantom lines 172.

In FIG. 1, the carriage drive lever has been adjusted to reciprocate between its actual position as shown in FIG. 1 and the position indicated by the phantom lines 173. When the lever 126 is in the phantom position 173, the pusher bar 17 is in the position indicated by the phantom lines 174.

The lever 126 is driven through a crank drive apparatus, the details of which are best seen in FIGS. 8 and 15. A crank 131 is secured to a driven shaft 132 extending upwardly from a right angle gear drive 133 (FIG. 7). A drive pin 134 is adjustably mounted on the crank 131 and extends into a slot 135 in the lever arm 126 as seen in FIGS. 8 and 1. As the shaft 132 is rotated, the drive pin 134 is moved in a circular path about the shaft 132, thereby sliding within the slot 135 and driving the lever 126 in a simple harmonic motion similar to a Whitworth motion, about the lever pivot point 128. Since the end 129 of the lever 126 is connected to the main carriage 30, the main carriage is driven along ways 61 and 62 in its first or second directions, depending on the motion of the lever 126.

The length of the stroke of the lever 126 is adjustable by virtue of the fact that the crank pin 134 is adjustable along the crank in a direction generally toward and away from the shaft 132. This adjustment is provided by the fact that the pin is mounted on a slidable member 136 which can be moved along the crank by the screw adjustment mechanism 137.

In a preferred embodiment of the invention, the driven pin 134 is adjustable along the crank to result in a minimum lever end stroke of 9 inches and a maximum lever end stroke of 24 inches. The maximum stroke of the lever being indicated, for example, by the lever positions shown by the phantom lines 124 and 125 in FIG. 1. For convenience, a graduated scale is provided on the crank so that the pin can be very easily adjusted to a position to the desired lever stroke.

The crank and lever drive for the main carriage has a unique advantage in that it provides for a relatively slow forward pushing motion but a relatively quick rearward motion. This is due to the fact that the crank pin moves in a counter-clockwise direction (as viewed from above). The generally semicircular path of the pin during the forward motion of the lever is generally further from the lever pivot 128 than the general semicircular path of the pin during the return or rearward motion of the lever. In other words, to drive the carriage forwardly in the first direction, the pin is driven in the slot 135 substantially toward the end 129 of the lever 126. To drive the carriage rearwardly, the pin is driven in the slot 135 substantially toward the end 128 of the lever 126.

It can thus be appreciated that the crank, the pin, the lever, the slot and the lever's pivot can all be positioned so that the initial acceleration of the lever in a forward direction is relatively minimal. The lever's rate of acceleration in this direction is slower than the lever's rate of acceleration of the reverse or return direction. The slower forward movement results in a very gentle pusher engagement with the ware being transferred, yet the return motion can be relatively quick. This drive has thus been found to be highly advantageous, particularly with relatively unstable ware.

As previously stated, the end 129 of the lever 126 is releasably secured to the main carriage 30. Thus, if either the carriage structures or the pusher bar mechanism engage a foreign obstruction (too large to be obviated by the rotation of the pusher bar as described), a load is transferred to the main carriage and the driving lever 126 is released. Further, jamming is thus eliminated. The releasable connection between the main carriage and the lever includes a pin 140 depending downwardly from the lever arm 126 and extending into a slot defined by a stationary block 141 and pivoted block 142. Block 142 can be pivoted about the pivot 143 in a clockwise direction to release the pin 140. When the block 142 pivots about its pivot point 143, the lever 126 is thus released to continue throughout its driven stroke. However, the carriage 30 is not driven and further jamming of the apparatus mounted on carriage 30 is eliminated.

A spring detent 144 is provided in the path of a distal end 145 of the pivoted block 142, the tension of the spring being such that the lever can move the detent and pivot around the pivot point in response to a predetermined load on the main carriage. A spring 146 is connected to the pivoted block 142 in order to facilitate movement to release the lever 126. The pivoted block can be reset by repositioning the pin 140 and the block 141 with respect to each other and thereafter rotating the pivoted block so as to depress the spring detent and reset the pivoted block 142 into its original position as depicted in the drawings.

The initial start position of the main carriage 30 can be adjusted with respect to the lever stroke 126 by virtue of the fact that the blocks 141 and 142, forming the drive surfaces for the lever connected pin 140, are adjustable in the first and second directions. This feature is best shown in FIGS. 8 and 11. In FIG. 11, a start position adjustment screw 150 is journalled on the main carriage 30. The screw follower 151 is attached to the screw and extends upwardly from the screw through a slot 152 in the main carriage 30. The screw follower is secured to a sliding block mount 153 on which are mounted the respective blocks 141 and 142. When the start position adjustment screw 150 is turned, the sliding block mount is moved in the first and second directions. This moves the blocks 141 and 142 with respect to the main carriage. Assuming that the lever 126 is maintained stationary, movement of the adjusting screw mechanism 150 will move the carriage along ways 61 and 62 with respect to the end 129 of the lever 126, and thereby the position of the main carriage 30 with respect to the lever may be adjusted. This adjustment may be made during operation of the loader.

From the foregoing description, it can be appreciated that as the lever 126 reciprocates between its start and stop positions, as determined by the stroke adjustment means on the crank 131, the main carriage 30 is reciprocated in the first and second directions. As the main carriage moves in its first and second directions, it carries with it the second carriage 31 also in the first and second directions. However, by virtue of the engagement of the cam follower 70 and the cam track, the second carriage 31 is also moved in third and fourth directions along the ways 64 and 65 with respect to the first carriage 30.

The pusher bar 17 depends from the secondary carriage. As the main carriage 30 is driven and assuming the cam slot is set such that the second carriage 31 moves transversely with respect to the main carriage 30, the pusher bar moves in a diagonal direction, indicated by the Arrow D in FIG. 1, and operates to push glassware from the cross conveyor 16 onto the lehr belt 11 in a diagonal direction. This direction, of course, can be modified by the lateral movement adjustment apparatus of the cam track as has been described, or by a cam providing a cam track having a different configuration so as to obtain a combination of diagonal, straight, or other movements of the pusher bar. It can thus be appreciated that the movement of the pusher bar 17 in the horizontal plane is the resultant of the simultaneous movements of the main carriage 30 and the secondary carriage 31. The combination of a diagonal pusher bar movement when taken with the highly advantageous gentle contact stroke has proven to be of high efficiency in handling inherently unstable ware.

OPERATION - CARRIAGE AND PUSHER BAR DRIVE CONTROL

The specific details of the control mechanism and circuitry do not form a portion of this invention and are not specifically described. Suitable controls could be provided by anyone of ordinary skill in the art having the benefit of this disclosure. For clarity, however, one form of control system will be partially described.

The drive apparatus and a control circuit system utilizes, in part, a three section rotary cam limit switch and an electro-pneumatic clutch and brake. The lever 126 is driven by crank 131 via the right angle gear drive 133. The right angle drive 133 is driven, via an electro-pneumatic clutch and brake unit 160, a motor 161 and a chain drive 162. When the clutch is engaged, in response to a counter signal from the take-off pusher apparatus, the chain drive rotates the drive shaft 163 which drives the right angle gear drive 133. Also when the clutch is engaged, it drives a shaft 164 which, through a chain and sprocket, drives the cam limit switch 165.

In operation, the clutch is energized in response to the counting of the predetermined number of take-off cycles of take-off push0the clutch is engaged, it causes rotation of the crank 131 which in turn drives the lever 126 to a forward position, for example, as indicated by phantom lines 173 in FIG. 1. In this position, pusher bar 17 has engaged glassware on the cross conveyor and pushed it onto the lehr belt. The forward motion of the pusher 17 is indicated by the phantom lines 174.

At the same time, the drive mechanism has also driven the control cam switch 165. This switch can be of any suitable commercial type and serves three functions. It signals the end of the pusher bar's forward stroke in the first direction. It signals the end of the pusher bar's return stroke, that is the movement of the pusher bar 17 in the direction of Arrow F shown in FIG. 4. It also resets the electrical control system to accept the next start signal in response to a predetermined count of take-off cycles of the take-off pusher 15. Of course, the electrical control system may be provided with a manual start push button for set up purposes.

As stated, after a start signal is received, the clutch engages and the forward pusher bar transfer stroke begins. The rotary limit switch is set up to signal the end of the pusher bar's forward stroke and stops the pusher bar's forward operation by disengaging the clutch (and braking). An adjustable dwell is build into the system so as to permit, at this time, glassware on the lehr belt to clear the pusher bar before allowing the pusher bar to be lifted (such as in the direction of Arrow E) for the return stroke. At the end of the dwell period, the control switch signals the controls for the air cylinder 117, which is then actuated to lift the pusher bar 17 through its rack and pinion drive mechanism. A further dwell of one or two seconds may be provided at this time to insure that the adjustable stroke air cylinder has lifted the pusher bar fully. At the end of this second delay, the clutch is engaged and the drive is actuated to rotate the crank 131 and move the lever 126 rearwardly. This drives the first carriage 30 in its second or rearward direction and thus the pusher bar 17 is moved in the direction of Arrow F. At this time, the rotary limit switch signals the end of the return stroke, stops the pusher bar operation and actuates the air cylinder 117 to lower the pusher bar to its down position and in readiness for another cycle.

It should be noted that the rotary control cam switch can be set to determine the angular start and stop dispositions of the crank and drive pin connected to the lever 126. From this, it will be recognized that the control system can be set up to obtain a variety of types of operational strokes of the pusher bar. For example, if it was desired to withdraw the pusher bar slightly, after its forward stroke and prior to its vertical movement, the control cams could be set so that the crank rotated slightly further in its counterclockwise direction during a push stroke so as to thereby slightly withdraw the pusher bar.

The preferred embodiment of the invention has been described as having three conveyors such that the direction of movement of ware is substantially the same in the lehr as on discharge from the forming apparatus. This construction is advantageous where it is desired to provide a straight production line. Of course, the cross conveyor could perform a double function, upon elimination of the take-off conveyor, and the ware from the forming apparatus could be directly deposited on the cross conveyor. In this instance, movement of ware in the lehr would be transverse to movement of the ware on discharge from the forming apparatus. The pusher bar would be actuated in response to a predetermined number of articles on the cross conveyor as counted by the discharge signal of the forming apparatus. The speed of the cross conveyor is, of course, adjusted as needed.

It will thus be appreciated that the invention provides highly unique and advantageous capabilities. It can be finely tuned through its adjustments and, while in operation, to a variety of glassware shapes and sizes. When the glassware is inherently unstable, this tuning is extremely advantageous and has resulted in a substantial production increase of such ware since less is damaged.

These and other modifications and improvements will become readily apparent from the foregoing detailed description and the drawings without departing from the scope of the present invention and the present inventors intend to be bound only by the appended claims.

We claim:

1. A lehr loader of the type having a lehr belt, a cross conveyor at an end of the lehr belt and moving transversely thereto, a main carriage mounted for movement in first and second directions parallel to the direction of movement of said lehr belt a second carriage movably mounted on said main carriage, a pusher mounted on said second carriage for transferring articles from said cross conveyor to said lehr belt, and means for driving said main carriage, said driving means comprising:
 a lever pivoted at a first end to said loader and means releasably connecting said lever at a second end to said main carriage,
 a slot in said lever between said first and second ends,
 a crank mounted at one end on a driven shaft, and
 a drive pin mounted on another end of said crank, said drive pin extending into said slot and rotating said lever about its pivoted first end, when said shaft drives said crank, so as to drive said main carriage in said first and second directions,
 said releasably connecting means disconnecting said lever from said main carriage in response to a predetermined maximum load applied to said main carriage by said lever.

2. A lehr loader as in claim 1 wherein said releasably connecting means is adjustable with respect to said carriage so as to render adjustable the disposition of the extreme positions of said main carriage in said first and second directions with respect to said cross conveyor and said lehr belt.

3. A lehr loader as in claim 2 wherein said releasably connecting means connecting said lever to said main carriage is adjustable during operation of said loader.

4. A lehr loader as in claim 1 including a second pin at said second end of said lever, and
 a transverse slot defined by members on said main carriage, said second pin extending into said slot between said members to drive said main carriage when said lever is moved.

5. A lehr loader as in claim 4 wherein said members are adjustable with respect to said carriage, in said first and second directions.

6. A lehr loader as in claim 4 wherein one of said members is a pivoted block, said block having one end releasably captured by a spring detent and having another end defining one side of said slot into which said second pin extends, said block pivoting about a point between said ends when said second pin exerts a predetermined maximum load on said block, in order to release said second pin from said main carriage.

7. A lehr loader as in claim 1 including means driving said main carriage in said first direction at one acceleration and in said second direction at another acceleration, said one acceleration being lesser than said other acceleration.

8. A lehr loader as in claim 1 wherein said drive pin is adjustably mounted for movement along said crank with respect to said pin such that adjustment of said pin varies the extent of movement of said main carriage in a direction parallel to the direction of movement of said lehr belt.

9. A lehr loader for loading glassware of varying shapes and sizes onto a lehr belt from a cross conveyor mounted to move generally transversely to said lehr belt at a loading end thereof and comprising:
 a main carriage movable a selected distance between first and second extreme positions in directions which are opposite to each other and parallel to the direction of movement of the lehr belt,
 means for adjusting the distance between said extreme positions,
 a second carriage mounted on said main carriage for transverse movement a selected distance between other extreme positions in third and fourth directions which are opposite to each other and are transverse to the directions of movement of said main carriage and of said lehr belt,
 means to adjust the distance between said other extreme positions,
 a pusher bar mounted on said second carriage for movement in vertical directions with respect to said lehr belt, said pusher being movable in a direction across said cross conveyor and toward said lehr belt, when said main and second carriages are moved, in order to push glassware from said cross conveyor onto said lehr belt,
 drive means for driving said main carriage between said extreme positions toward and away from said lehr belt, and for imparting to said main carriage an initial acceleration toward said lehr belt, which initial acceleration is lesser than subsequent acceleration toward said lehr belt, and
 means for adjusting, with respect to said cross conveyor and lehr belt, the initial first position of said extreme positions of said main carriage in said first and second directions, without changing the distance between said first and second extreme positions, so that said pusher engages said glassware during said initial acceleration.

10. A lehr loader as in claim 9 wherein said second carriage is slidably mounted on said main carriage,
 an elongated cam means and means pivotally mounting said cam means on said loader,
 a cam follower mounted on said second carriage and cooperatively engaged in said cam means, and wherein said means to adjust the distance of movement of said second carriage between said other extreme positions includes means for pivoting said elongated cam means with respect to the direction of movement of said lehr belt.

11. A lehr loader for loading glassware of varying shapes and sizes onto a lehr belt from a cross conveyor mounted to move generally transversely to said lehr belt at a loading end thereof, and comprising:

a main carriage movable through a selected distance between first and second extreme positions, the direction of movement being parallel to the direction of movement of the lehr belt, a second carriage mounted on said main carriage for transverse movement a selected distance between other extreme positions, the direction of movement of the second carriage being transverse to the direction of movement of the main carriage and of the lehr belt, a pusher bar mounted on said second carriage for movement in vertical directions with respect to the movements of said carriages, said cross conveyor, and said lehr belt, said pusher bar being movable across said cross conveyor toward said lehr belt to transfer glassware from said cross conveyor onto said lehr belt, means for adjusting the distance of movement of said main carriage between said first and second extreme positions, means for adjusting the distance of movement of said second carriage between said other extreme positions in a direction transverse to said lehr belt, and means for adjusting the position of the first extreme position of the main carriage, in a direction parallel to the direction of movement of the lehr belt and independently of the selected distance of movement of the main carriage between said first and second extreme positions, the respective adjustments resulting in corresponding adjustment of the pusher bar and thereby providing for the engagement of the glassware of varying shapes and sizes by the pusher bar during initial movement of the main carriage to transfer the glassware from the cross conveyor to the lehr belt.

12. A lehr loader as in claim 11 including means for driving said main carriage from said first extreme position toward said second extreme position and in the direction of movement of the lehr belt, and for imparting to said carriage a varying acceleration toward said second extreme position, said acceleration varying from an initially lesser acceleration to a subsequently greater acceleration toward said second extreme position.

13. A lehr loader as in claim 11 further comprising:
a lever pivoted at one end to said loader and connected at another end to said main carriage,
a slot intermediate the ends of said lever and extending between said ends,
a crank mounted at one end on a drive shaft, and
a drive pin on another end of said crank, said drive pin extending into said slot and rotating said lever about its pivot point to said loader in order to move said main carriage when said crank is rotated by said driven shaft.

14. A lehr loader as in claim 13 wherein said pin is adjustable along said crank toward and away from said driven shaft in order to vary the distance of movement of said main carriage between said extreme positions and therefore the distance of movement of said pusher bar in the same directions.

15. A lehr loader as in claim 13 wherein said lever is releasably connected at its other end to said main carriage.

16. A lehr loader as in claim 13 wherein the point of connection between said lever and said main carriage is adjustable in a direction parallel to the direction of movement of the lehr belt during operation of said loader.

17. A lehr loader as in claim 11 further comprising:
an elongated cam slot mounted on said loader,
a cam follower extending into said cam slot and attached to said second carriage to cause said second carriage and therefore said pusher bar to move transversely with respect to the direction of movement of said main carriage and said lehr belt when said cam slot varies slightly in its direction of extension from the direction of movement of said lehr belt.

18. A lehr loader as in claim 17 wherein said cam slot is adjustably pivoted to said loader so that the distance of movement of said second carriage and said pusher bar between said other extreme positions can be varied.

19. A lehr loader as in claim 11 including:
means for moving said pusher bar in said vertical directions, and
means for adjusting the distance of movement of said pusher bar between extreme positions in said vertical directions.

20. A lehr loader as in claim 19 wherein said moving means comprises an air cylinder having a piston movable in two directions and connected to said pusher bar, and said adjusting means including adjustable stop means for engaging a member connected to said piston and selectively limiting the movement of said piston in one of said vertical directions.

21. A lehr loader as in claim 13 wherein said lever is driven by said crank and driven pin to accelerate said main carriage slower in the direction of movement of said lehr belt than in an opposite direction and including:
means for driving said crank to move said driven pin in said slot substantially toward said other end of said lever to initially move said main carriage in the direction of movement of said lehr belt, and
means for driving said crank to move said driven pin in said slot substantially toward the pivoted end of said lever to initially move said main carriage in said opposite direction.

22. A lehr loader as in claim 15 including means releasing said lever from said main carriage in response to the exertion of a predetermined load on said carriage by said lever.

23. A lehr loader of the type for loading glassware onto a lehr belt from a cross conveyor mounted to move generally transversely to said lehr belt, including
a main carriage movable in a direction parallel to the direction of movement of the lehr belt,
a second carriage mounted on said main carriage for transverse movement in a direction transverse to the direction of movement of the main carriage and of the lehr belt,
a pusher bar mounted on said second carriage for movement across the cross conveyor toward the lehr belt for transferring glassware from the cross conveyor onto the lehr belt,
drive means for driving said main carriage, and
means for connecting said drive means to said main carriage and for disconnecting said drive means from said main carriage in response to the exertion of a predetermined maximum load on said carriage by said drive means.

24. A lehr loader for tranferring glassware from a cross conveyor onto a lehr belt and including:
a main carriage movable in a direction parallel to the direction of movement of the lehr belt, a second carriage mounted on said main carriage and movable between extreme positions in directions transverse to the direction of movement of the lehr belt, a pusher means mounted on the second carriage for engaging and pushing glassware from the cross conveyor onto the lehr belt, and means for adjusting the distance of movement of said second carriage between said extreme positions, said means including an elongated cam track pivotally and adjustably mounted to said loader and a cam follower attached to said second carriage and cooperating with said cam track to move said second carriage between said extreme positions as said main carriage moves, said cam track being adjustable about its pivot in order to permit adjustment of the distance of movement of said second carriage between said extreme positions.

25. A lehr loader for transferring glassware from a cross conveyor to the lehr belt of an annealing lehr, and having a pusher for transferring articles from said cross conveyor onto said lehr belt toward said lehr, said loader comprising:

a carriage, a rotatable drive shaft mounted on said carriage, means to rotate said drive shaft, pusher lift bars, each connected at a lower end to said pusher, means on said drive shaft for cooperating with means on said pusher lift bars to drive said pusher lift bars to raise and lower said pusher when said drive shaft rotates, first bracket means mounted on said drive shaft so that said drive shaft is rotatable with respect thereto, second bracket means connected to said first bracket means, said second bracket means slidably supporting said pusher lift bars, yieldable biasing means connected between said first bracket means and said carriage for biasing said first and said second bracket means in a direction around said drive shaft and thereby urging said pusher toward said lehr, and means mounted on said carriage for adjustably limiting the movement of the first and second bracket means about said drive shaft.

* * * * *

UNITED STATES PATENT OFFICE
CERTIFICATE OF CORRECTION

PATENT NO. : 3,853,213
DATED : December 10, 1974
INVENTOR(S) : James E. Lehmann, John S. Lush It is certified that error appears in the above-identified patent and that said Letters Patent are hereby corrected as shown below:

Column 1, line 12, after "transfer" and before "ware", insert the word --the-- therefore.

Column 1, line 27, delete the word "exends" and insert --extends-- therefore.

Column 7, line 18, insert quotation marks around the words  ware-spotter .

Column 8, line 9, delete the word "prssurized" and insert --pressurized-- therefore.

Column 8, line 42, insert quotation marks around the words  ware-spotter .

Column 13, line 66, delete "push0" and insert the words --pusher 15 when-- therefore.

Column 14, line 25, delete the word "build" and insert the word --built-- therefore.

Signed and Sealed this twenty-ninth Day of July 1975

[SEAL]

Attest:

RUTH C. MASON
Attesting Officer

C. MARSHALL DANN
Commissioner of Patents and Trademarks